United States Patent [19]
Duprez

[11] Patent Number: 5,381,952
[45] Date of Patent: Jan. 17, 1995

[54] FAIL-SAFE THERMOSTAT

[75] Inventor: Wayne R. Duprez, Waltham, Mass.

[73] Assignee: Standard-Thomson Corporation, Waltham, Mass.

[21] Appl. No.: 137,849

[22] Filed: Oct. 15, 1993

[51] Int. Cl.⁶ ............................................. F01P 7/16
[52] U.S. Cl. ........................... 236/34.5; 236/DIG. 2
[58] Field of Search ................... 236/34, 34.5, DIG. 2

[56] References Cited

U.S. PATENT DOCUMENTS

| | | | |
|---|---|---|---|
| 3,768,731 | 10/1973 | Lavedo | 236/34.5 X |
| 4,013,218 | 3/1977 | King | 236/34.5 |
| 4,280,655 | 7/1981 | Duprez et al. | 236/34.5 |
| 4,537,346 | 8/1985 | Duprez | 236/34.5 |
| 4,562,953 | 1/1986 | Duprez et al. | 236/34.5 |
| 4,763,834 | 8/1988 | Duprez | 236/34.5 |
| 4,883,225 | 11/1989 | Kitchens | 236/34.5 |
| 4,942,849 | 7/1990 | Shelton | 236/34.5 |
| 5,174,496 | 12/1992 | Bourgin | 236/34.5 |
| 5,188,287 | 2/1993 | Chamot | 236/DIG. 2 |
| 5,207,744 | 5/1993 | Heafner | 236/DIG. 2 |

Primary Examiner—William E. Tapolcai
Attorney, Agent, or Firm—Barnes & Thornburg

[57] ABSTRACT

A fail-safe thermostat includes a stationary valve member configured to be positioned between conduit components of the engine cooling system, a movable valve member for engaging the valve seat to block fluid flow into the conduit through the opening, an operating spring for biasing the movable valve member to a closed position against the valve seat of the stationary valve member, and a thermally responsive actuator for moving the movable valve member to an open position away from a valve seat when the ambient temperature exceeds a first predetermined temperature to permit fluid flow into the conduit. The apparatus further includes a bimetallic frame member coupled the stationary valve member. The frame member is configured to compress and hold the operating spring in engagement with the movable valve member. The frame member is configured to disengage itself from the stationary valve member when the ambient temperature exceeds a second predetermined temperature and upon failure of the movable valve member to move to its the open position.

22 Claims, 3 Drawing Sheets

FAIL-SAFE THERMOSTAT

BACKGROUND AND SUMMARY OF THE INVENTION

The present invention relates to a fail-safe thermostat. More particularly, the present invention relates to an automotive thermostatic fluid control valve adapted for use in an engine coolant system and configured to have a fail-safe configuration for permanently opening a radiator conduit upon failure of the thermostat to reduce the likelihood of overheating the engine.

It is well known to provide a thermostatic fluid control valve or thermostat positioned in the coolant system of an internal combustion engine to control the volume of fluid flow through the heat exchanger or radiator as fluid circulates in the coolant system of the engine. Therefore, the thermostat maintains the coolant fluid circulating through the coolant system of the engine at a desired temperature. Conventional thermostats include a stationary valve member which is secured within a conduit of the cooling system. The stationary valve member has an annular valve seat forming a fluid port or opening. The thermostat also includes a movable valve member having a closure portion for engaging the valve seat to close the opening. A thermally responsive actuator is provided for moving the movable valve member relative to the stationary valve member in response to changes in temperature of the coolant fluid within the cooling system. As the temperature rises above a predetermined level, the actuator moves the movable valve member away from the valve seat to permit the coolant fluid to circulate through the radiator to cool the coolant fluid. Therefore, the thermostat maintains the coolant temperature substantially constant during operation of the engine.

It has long been recognized in the automotive industry that a significant cause of engine failure is overheating. One cause of engine overheating is the failure of the thermostat to open to permit coolant fluid to flow to the radiator. This failure of the thermostat to open is most often caused by the loss of the expansive material in the power element or thermally responsive actuator, which can occur for any number of reasons. When the actuator fails, the movable valve member is not moved away from the valve seat when the engine coolant temperature rises above the predetermined temperature. It is understood, however, that the thermostat may fail for other reasons. When the thermostat does not actuate, the pressure of the coolant fluid and the force of the thermostat operating spring cause the valve to remain in a closed position. A typical thermostat therefore fails in a closed valve or engine overheat mode.

One object of the present invention is to provide a fail-safe thermostatic control valve that will permit coolant flow to the radiator upon failure of the actuator under engine overheat conditions.

Another object of the present invention is to provide a fail-safe thermostat which is capable of withstanding an overheat incident which is not caused by failure of the thermally responsive actuator and remain fully functional.

Yet another object of the present invention is to provide a fail-safe thermostat that will remain in the open valve position, if there is a failure of the thermally responsive actuator, to provide an indication that replacement of the thermostat is necessary.

Fail-safe thermostats are generally known. See, for example, Kitchens U.S. Pat. No. 4,883,225. The Kitchens '225 patent discloses a disk valve secured to a cylindrical body by a fusible alloy. When the normal operating temperature range of the engine is substantially exceeded, the fusible alloy melts, thereby releasing the main disk valve from the cylindrical body. The main disk valve is then forced upwardly by a compression spring to permit full coolant flow through the radiator passageway. A problem associated with using a fusible alloy such as the fusible alloy disclosed in the Kitchens '225 patent is that the fusible alloy must resolidify somewhere inside the coolant system of the engine when the temperature drops below the melting point of the fusible alloy. In addition, it is possible for the fusible alloy to melt even though the thermally responsive actuator and the rest of the thermostat are functioning properly due to any of a number of other causes of overheat.

Another example of the use of a fusible material to provide a fail-safe oil flow control apparatus is illustrated in Duprez U.S. Pat. No. 4,537,346 owned by the assignee of the present invention. The Duprez '346 patent directs the flow of oil through the heat exchanger upon melting of the fusible material.

Conventional fusible alloy fail-safe thermostats must have an alloy melting temperature set above the normal operating range of the engine. Therefore, the engine temperature must exceed the normal operating temperature and enter the overheat range before the fusible alloy will melt. This overheat may cause damage to the engine. Another disadvantage of fusible alloy fail-safe thermostats is that the thermostat will fail as a result of any engine overheat condition, regardless of the cause (low coolant, etc.). Advantageously, the fail-safe thermostat of the present invention provides a two step operation which permits the fail-safe temperature to be set within the normal operating range. Two conditions must be met in order for the thermostat of the present invention to fail. First, the temperature must exceed the preset fail-safe temperature, and second, the thermally responsive actuator of the thermostat must be inoperative. Therefore, as long as the actuator is functioning properly, the fail-safe thermostat of the present invention will not fail. This feature prevents failure of the thermostat due to an overheat condition which is not caused by failure of the thermally responsive actuator.

According to one aspect of the present invention, a fail-safe thermostat apparatus is provided for controlling fluid flow through an engine cooling system in response to changes of an ambient temperature surrounding the apparatus. The apparatus includes a stationary valve member configured to be positioned between conduit components of the engine cooling system. The stationary valve member is formed to include a flange ring and a valve seat configured to define an opening into a conduit leading to the radiator. The apparatus also includes a movable valve member for engaging the valve seat to block fluid flow into the conduit through the opening, an operating spring for biasing the movable valve member to a closed position against the valve seat of the stationary valve member, and a thermally responsive actuator coupled to the stationary valve member and to the movable valve member to move the movable valve member to an open position away from the valve seat when the ambient temperature exceeds a first predetermined temperature to permit fluid flow into the conduit. The apparatus further includes a bimetallic frame member having at least two fingers configured to engage the flange ring or other means of attachment of the stationary valve member to couple the frame member to the stationary valve member. The frame member also has a base configured to compress and hold the operating spring in engagement with the movable valve member. The fingers of the frame member are configured to move radially inwardly and disengage from the flange ring of the stationary valve member when the ambient temperature exceeds a second predetermined temperature greater than the first predetermined temperature. The second predetermined temperature is preferably set at about a maximum operating temperature of the engine. The apparatus still further includes a fail-safe spring located on an opposite side of the movable valve member from the operating spring. The operating spring applies a larger biasing force to the movable valve member than the fail-safe spring so that the movable valve member is normally closed. The fail-safe spring biases the movable valve member away from the valve seat to move the movable valve member to the open position upon disengagement of the frame member from the stationary valve member. The movable valve member is configured to block radially inward movement of the fingers of the frame member when the movable valve member is in the open position, thereby preventing disengagement of the frame member from the stationary valve member of a functional thermostat.

In the illustrated embodiment, the thermally responsive actuator includes a movable stem. The stationary valve member includes a flange trapped between the conduit components of the engine cooling system and a bridge for coupling the stem of the thermally responsive actuator to the stationary valve member. The fail-safe spring is located between the thermally responsive actuator and the bridge for forcing the movable valve member to the open position upon disengagement of the frame member from the stationary valve member to permit fluid to flow through said opening.

Also in the illustrated embodiment, the bimetallic frame member includes a first metal material having a first coefficient of thermal expansion located radially outwardly from a second metal material having a second coefficient of thermal expansion. The first coefficient of thermal expansion is greater than the second coefficient of thermal expansion so that the at least two fingers of the frame member move radially inwardly to disengage the fingers of the frame member from the flange ring when the ambient temperature exceeds the second predetermined temperature.

In another illustrated embodiment, the movable valve is coupled to a first end of the operating spring and the bimetallic frame member is coupled to a second end of the operating spring to prevent loose parts from entering the cooling system of the engine upon disengagement of the frame member from the stationary valve member. A bypass valve may be coupled to the thermally responsive actuator for closing a bypass conduit of the cooling system in response to movement of the thermally responsive actuator.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
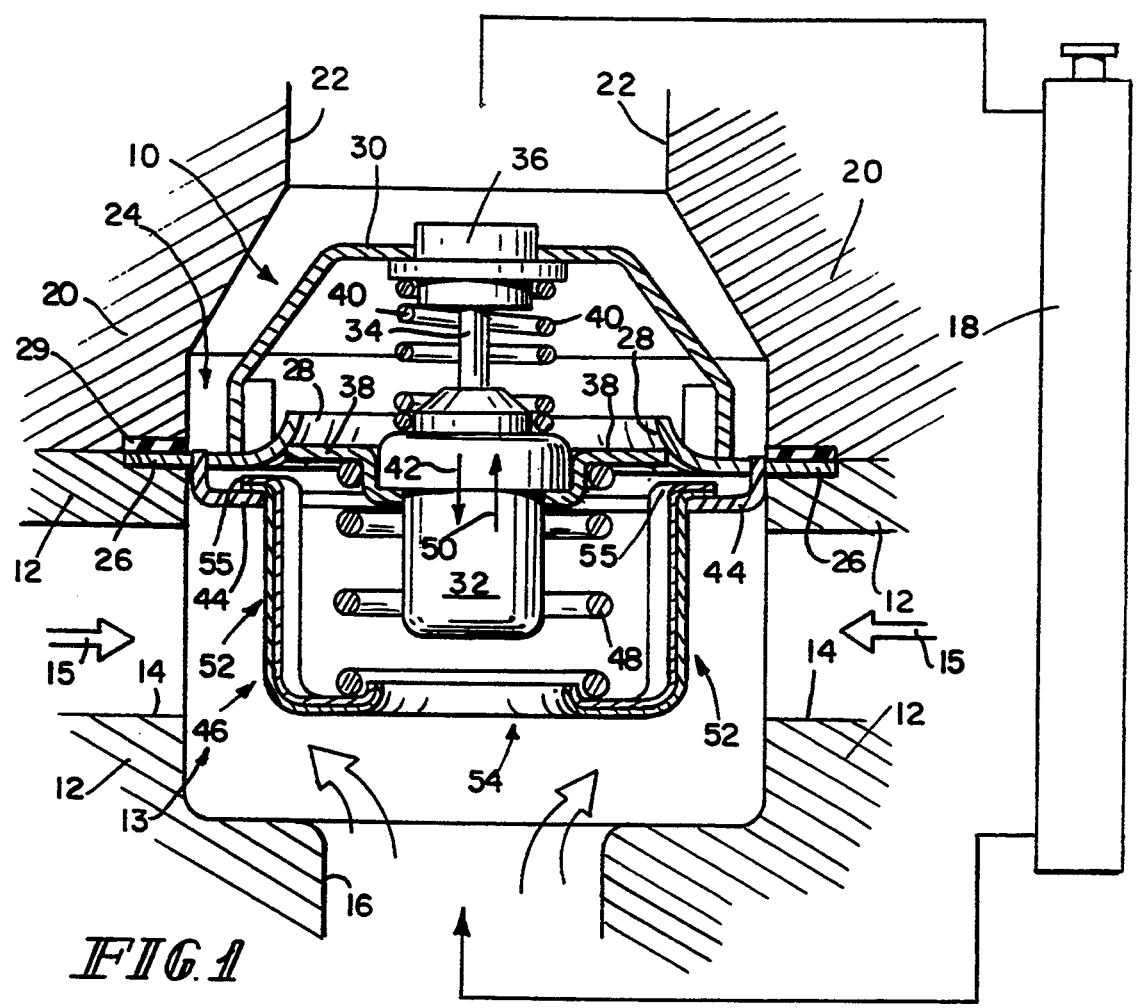
FIG. 1 is a partially diagrammatical sectional view of a fail-safe thermostat of the present invention installed in a constant bypass coolant system of an automotive engine.

Referring now to the drawings, FIG. 1 illustrates one embodiment of a fail-safe thermostat 10 of the present invention for controlling coolant fluid flow through a coolant system of an engine. FIG. 1 diagrammatically illustrates an engine block 12 formed to include a first conduit 14 for receiving fluid flow from the engine in the direction of arrows 15 and a bypass conduit 16 for conducting coolant fluid flow back through the engine without passing through a heat exchanger or radiator 18. A cover 20 is removable coupled to engine block 12 to provide a passageway 22 leading to radiator 18.

Fail-safe thermostat 10 includes a stationary valve member 24 including a flange 26 and a curved annular valve seat 28. Flange 26 is trapped between engine block 12 and cover 20 and sealed with a gasket 29. Valve seat 28 defines an opening for coolant fluid to pass from chamber 13 into radiator conduit 22. Stationary valve member 24 also includes a bridge 30 coupled to flange 26. A thermally responsive actuator 32 includes a stem 34 coupled to bridge 30 by a stem lock 36. A movable valve member 38 is coupled to thermally responsive actuator 32. A fail-safe spring 40 is held and compressed between bridge 30 and thermally responsive actuator 32 to apply a biasing force on actuator 32 and movable valve 38 in the direction of arrow 42.

Stationary valve member 24 is formed to include flange ring 44 for coupling a bimetallic frame member 46 to stationary valve member 24. In other words, frame member 46 is not permanently secured to stationary valve member 24 like conventional thermostats. An operating spring 48 is held and compressed in tension between frame member 46 and movable valve 38 by frame member 46 to apply a biasing force to actuator 32 and movable valve 38 in the direction of arrow 50. Operating spring 48 applies a larger biasing force to movable valve member 38 than fail-safe spring 40. Therefore, movable valve member 38 is held in a normally closed position against valve seat 28 as illustrated in FIGS. 1 and 3.

Figure 2:
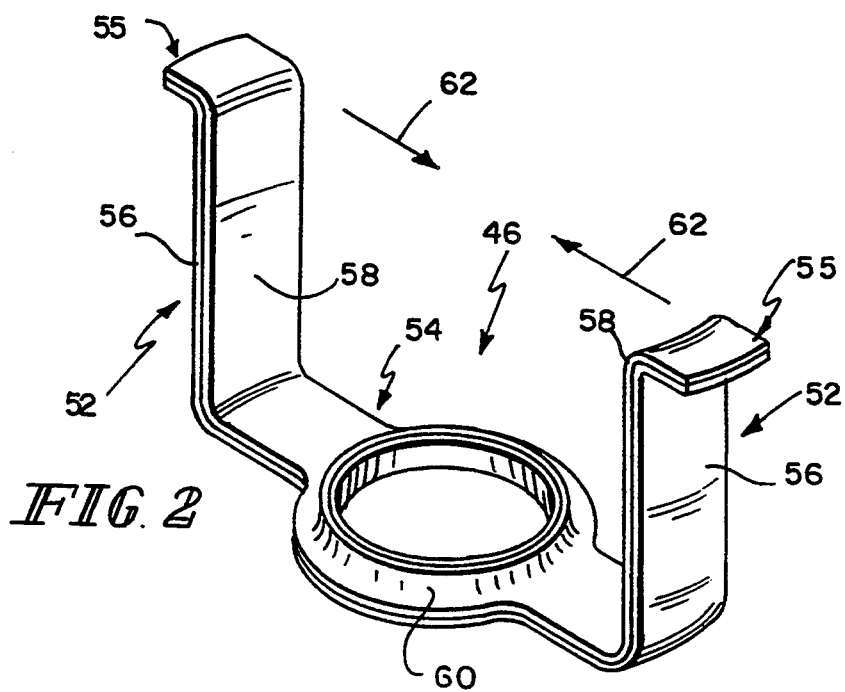
FIG. 2 is a perspective view illustrating the configuration of a bimetallic frame member of the present invention including a pair of bimetallic fingers extending upwardly from a base.

The configuration of bimetallic frame member 46 is best illustrated in FIG. 2. Frame member 46 includes a pair of fingers 52 extending upwardly away from a base 54. Frame member 46 includes a first metal material 56 located radially outside a second metal material 58. Fingers 52 are formed to include bent tab sections 55 for engaging flange ring 44 of stationary valve member 24 to couple frame member 46 to stationary valve member 24. It is understood that other means may be provided for coupling tab sections 55 of frame member 46 to stationary valve member 24. For instance, tabs, hooks, or other suitable fasteners may be used in place of flange ring 44. Base 54 of frame member 46 includes an annular curved section 60 for engaging operating spring 48. It is understood that frame member 46 can be constructed from any bimetallic materials that are conventionally available. For example, stainless steel alloys can be used. It is important that the outside metal material 56 has a coefficient of thermal expansion that is greater than the coefficient of thermal expansion of inner metal material 58. This causes the fingers 52 to bend radially inwardly in the direction of arrows 62 as the temperature of the coolant fluid surrounding frame member 46 increases to a predetermined fail-safe temperature. Although frame member 46 consists of two dissimilar metals, the materials are bonded together during manufacture of the strip stock and therefore frame member 46 is one piece. Although the illustrated embodiment discloses two fingers 52 extending upwardly from base 54, it is understood that additional fingers 52 may be added if desired.

Figure 3:
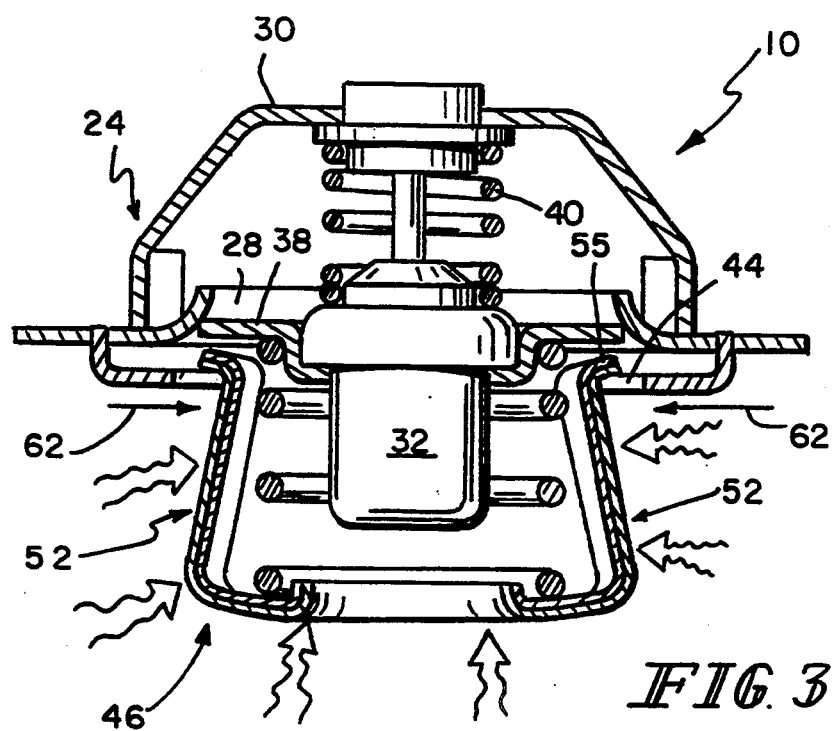
FIG. 3 is a sectional view similar to FIG. 1 in which a thermally responsive actuator has failed and the bimetallic frame member is subjected to heat above a predetermined temperature, thereby causing the fingers of the frame member to bend inwardly.
Figure 4:
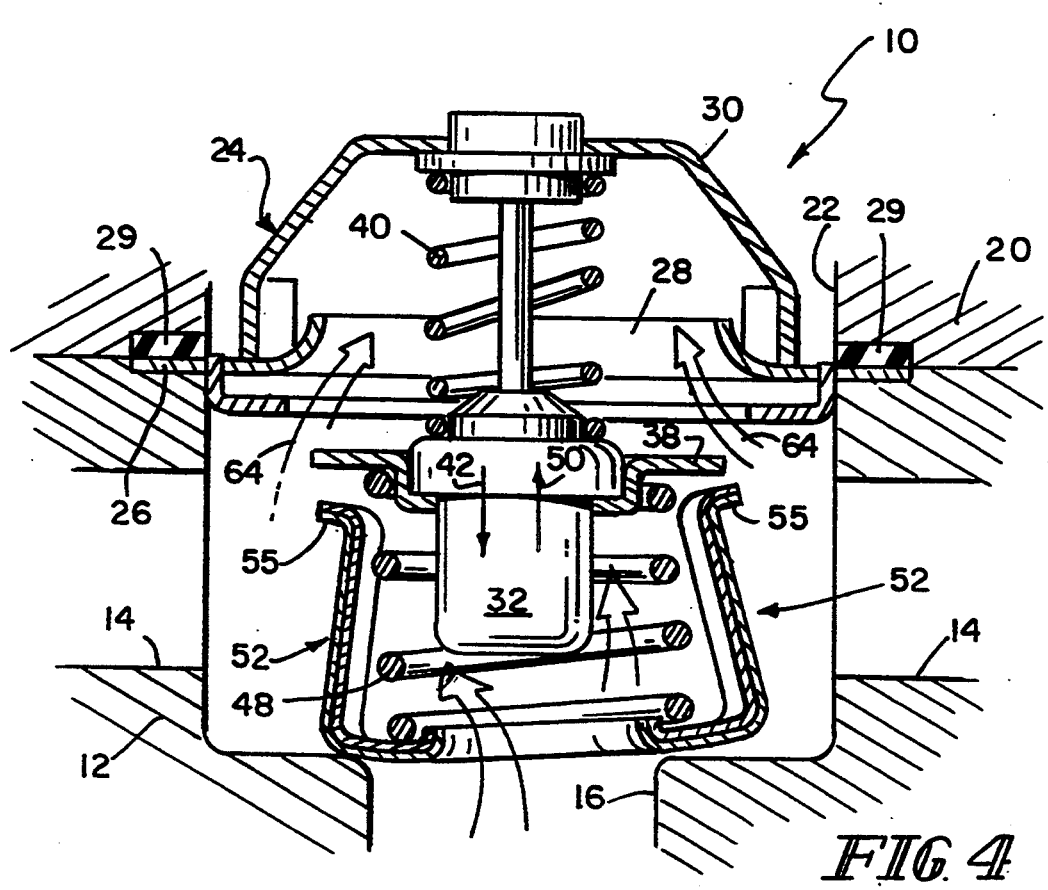
FIG. 4 is a sectional view similar to FIGS. 1 and 3 in which the fingers of the frame member have moved radially inwardly to disengage the fingers from a flange ring of a stationary valve member so that a fail-safe spring forces a movable valve member away from the stationary valve member to permit flow of coolant fluid to the radiator during an overheat condition.

FIGS. 3 and 4 illustrate operation of the fail-safe thermostat 10 when the thermally responsive actuator 32 fails to move movable valve 38 away from valve seat 28 to an open position. If actuator 32 fails for any reason, the engine can overheat since coolant fluid cannot pass to radiator 18 through radiator conduit 22. The cooling system of an automobile is typically designed to operate at temperatures of up to about 260° F. Above 260° F., the pressure of coolant fluid exceeds the pressure cap and boils over. Therefore, as illustrated in FIG. 3, fingers 54 of frame member 46 are configured to bend or move radially inwardly in the direction of arrows 62 when the temperature of coolant fluid flowing through the engine reaches the predetermined fail-safe temperature. The predetermined fail-safe temperature for disengagement of frame member 46 is preferably set at about the maximum operating temperature of the engine. Preferably, the fail-safe temperature for disengagement of frame member 46 is between about 255° F. and about 260° F. As discussed above, fusible alloy fail-safe thermostats must have a fail-safe temperature set above the normal operating temperature range of the engine.

When actuator 32 fails for any reason, and when the temperature of the coolant fluid rises above the predetermined fail-safe temperature, fingers 52 move inwardly in the direction of arrows 62 and disengage tabs 55 from flange ring 44 of stationary valve member 24. As illustrated in FIG. 4, disengagement of fingers 52 releases the biasing force of operating spring 48 on actuator 32 and movable valve 38. Once the tension of operating spring 48 is removed, fail-safe spring 40 moves actuator 32 and movable valve member 38 in the direction of arrow 42 so that movable valve member 38 moves to an open position away from valve seat 28 to permit flow of coolant fluid in the direction of arrows 64 into radiator conduit 22. The spring force of fail-safe spring 40 must be sufficient to overcome pressure of the coolant fluid which tends to force movable valve member 38 closed in the direction of arrow 50. Movement of movable valve 38 away from valve seat 28 permits flow of coolant fluid to radiator 18 to prevent loss of coolant fluid due to boil over and to reduce the likelihood of damaging the engine due to an overheat condition.

When frame member 46 is disengaged from stationary valve member 24, movable valve member 38 will remain in the open position at all times. This provides an indication that thermostat 10 has failed and needs to be replaced since the engine will not warm up to its operating temperature when the valve is constantly open.

Figure 5:
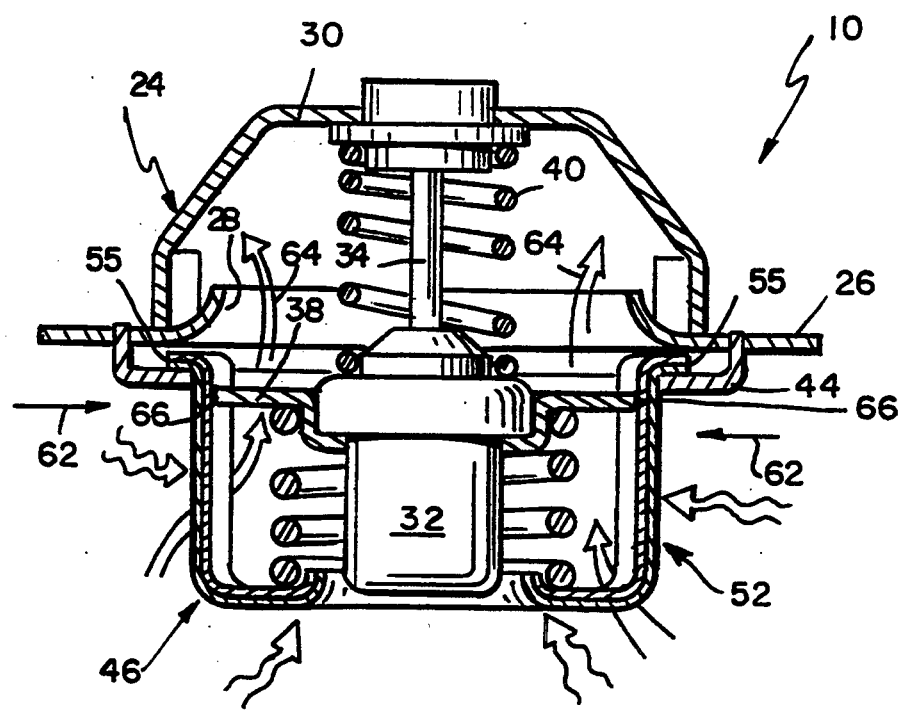
FIG. 5 is a sectional view similar to FIGS. 1, 3, and 4 in which the thermally responsive actuator is functioning properly to move the movable valve member to an open position away from the stationary valve member when the temperature rises above a predetermined temperature to permit flow of coolant fluid to the radiator and to block disengagement of the fingers of the frame member from the flange ring of the stationary valve member.

The predetermined temperature for movement of thermally responsive actuator 32 is set below the predetermined fail-safe temperature for disengagement of frame member 46. Therefore, if actuator 32 is functioning properly, actuator 32 will move on stem 34 in the direction of arrow 42 to the position illustrated in FIG. 5 before frame member 46 disengages itself from stationary valve member 24. In this position illustrated in FIG. 5, movable valve 38 moves to the open position away from valve seat 28 to permit coolant fluid flow in the direction of arrows 64 into radiator passageway 22. In addition, an outer edge 66 of movable valve 38 blocks movement of fingers 54 in the direction of arrows 62. Therefore, when thermally responsive actuator 32 and the rest of thermostat 10 are properly functioning, outer edge 66 of movable valve 38 prevents frame member 46 from disengaging itself from flange ring 44.

Figure 6:
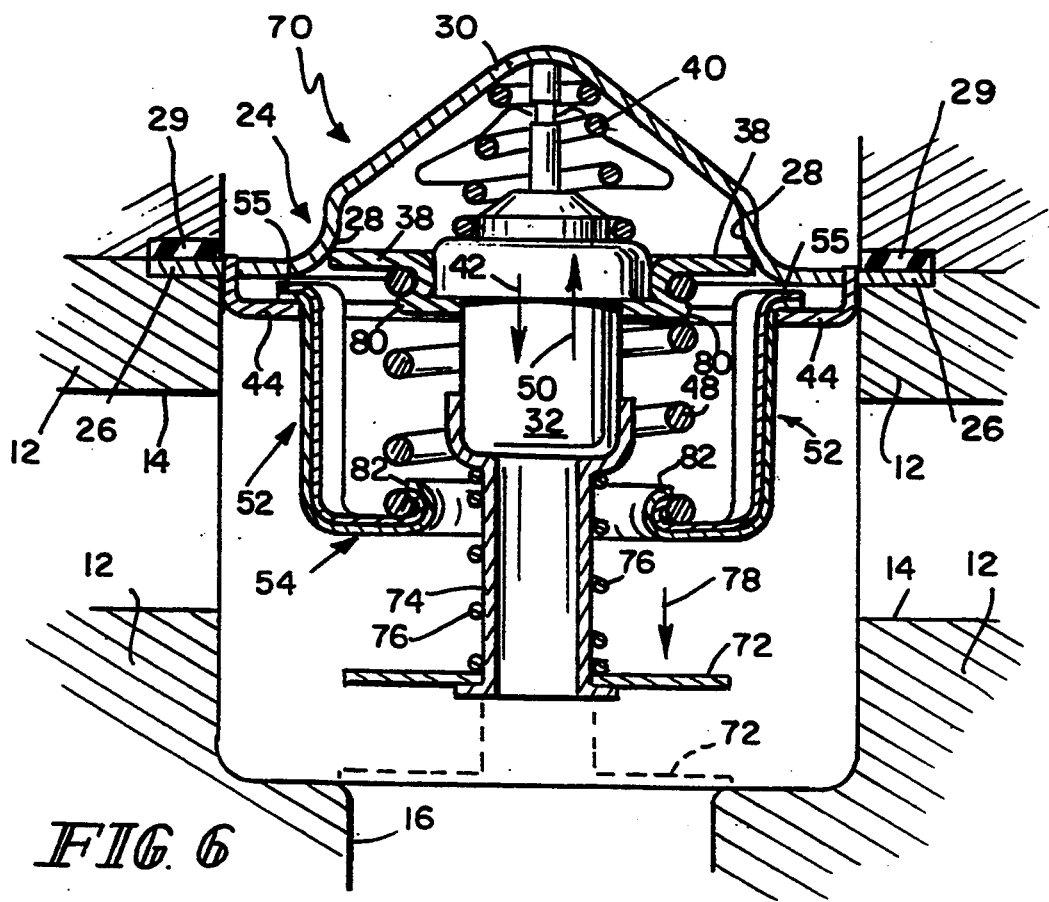
FIG. 6 is a partially diagrammatical sectional view taken through another embodiment of the present invention which also includes bypass control valve member for closing a bypass conduit upon movement of the movable valve member to the open position.

Another embodiment of the present invention is illustrated in FIG. 6. The thermostat 70 illustrated in FIG. 6 is a bypass controlling thermostat. Those numbers referenced by numbers in FIGS. 1–5 perform the same or similar function. In addition to opening flow conduit 22 to radiator 18 to allow coolant fluid to flow to radiator 18, thermostat 70 also closes bypass conduit 16 with a bypass valve 72. Bypass valve 72 is coupled to thermally responsive actuator by a cylindrical member 74. A biasing spring 76 is configured to surround cylindrical member 74 to apply a biasing force to bypass valve 72 in the direction of arrow 78. When actuator moves on stem in the direction of arrow 78, bypass valve 72 moves to the dotted position illustrated in FIG. 6 to close bypass conduit 16. Bypass conduit 16 is used to provide coolant flow within engine block 12 during warmup to prevent hot spots from forming in the heads of the engine. Coolant fluid flow through bypass conduit does not go to radiator 18 and is therefore not cooled and does not retard engine warm up. Thermostats with bypass valve configurations such as thermostat 70 illustrated in FIG. 6 are becoming more prevalent in the industry. In the FIG. 6 embodiment, movable valve 38 is coupled to a first end of operating spring 48 by annular section 80 and bimetallic frame member 46 is coupled to a second end of operating spring 48 by curved annular section 82 to prevent loose parts from entering the cooling system of the engine upon disengagement of frame member 46 from stationary valve member 24.

Therefore, fail-safe thermostat 10 advantageously provides a "selective" fail-safe feature. As long as the thermostat valve assembly and actuator 32 are functioning properly to move movable valve member 38 to an open position (FIG. 5) past a top edge of frame member 46 defined by tabs 55, the fail-safe release feature of the present invention will be prevented and thermostat 10 will function normally. This feature will allow thermostat 10 to "survive" an overheat condition that was caused by an event unrelated to the thermostat such as: low coolant levels, fan failure, faulty water pump, or faulty pressure cap. When the overheat condition is corrected, fail-safe thermostat 10 resumes an unaffected normal function. When both the necessary conditions of a high temperature above the predetermined fail-safe temperature for moving fingers 52 radially inwardly and a low stroke of the movable valve member 38 occur, frame member 46 will detach from flange ring 44 to cause both operating spring 48 and fail-safe spring 40 to extend and move movable valve member 38 to its open position. When frame member 46 is detached, movable valve member 38 permanently remains in its open position. After recovery of the overheat, the engine will no longer have thermostatic control. The permanently open valve position will prevent or retard engine warm-up on subsequent starts and will also cause serious heater output degradation. These problems will provide an indication to the operator or service personnel that the thermostat should be replaced.

Although the invention has been described in detail with reference to a certain preferred embodiment, variations and modifications exist within the scope and spirit of the invention as described and defined in the following claims.

What is claimed is:

1. A fail-safe thermostat apparatus for controlling fluid flow through an engine cooling system in response to changes of an ambient temperature surrounding the apparatus, the apparatus comprising:
   a stationary valve member configured to be positioned between conduit components of the engine cooling system, the stationary valve member being formed to include a valve seat configured to define an opening into a conduit;
   a movable valve member for engaging the valve seat to block fluid flow into the conduit through the opening;
   an operating spring for biasing the movable valve member to a closed position against the valve seat of the stationary valve member;
   a thermally responsive actuator coupled to the stationary valve member and to the movable valve member to move the movable valve member to an open position away from the valve seat when the ambient temperature exceeds a first predetermined temperature to permit fluid flow through the conduit; and
   a bimetallic frame member for engaging the stationary valve member to compress and hold the operating spring in engagement with the movable valve member, the frame member being configured to disengage itself from the stationary valve member when the ambient temperature exceeds a second predetermined temperature greater than the first predetermined temperature to release the operating spring and permit the movable valve member to move away from the valve seat, the movable valve member being configured to prevent disengagement of the frame member from the stationary valve member when the movable valve member is in the open position.

2. The apparatus of claim 1, further comprising a fail-safe spring located on an opposite side of the movable valve member, the fail-safe spring applying a biasing force against the movable valve member away from the valve seat to force the movable valve member to the open position upon disengagement of the frame member from the stationary valve member to permit fluid to flow through said opening.

3. The apparatus of claim 2, wherein the operating spring applies a greater biasing force to the movable valve member than the fail-safe spring so that the movable valve member is normally closed.

4. The apparatus of claim 1, wherein the thermally responsive actuator includes a movable stem, and wherein the stationary valve member includes a flange trapped between the conduit components of the engine cooling system and a bridge for coupling the stem of the thermally responsive actuator to the stationary valve member.

5. The apparatus of claim 4, further comprising a fail-safe spring located between the movable valve member and the bridge for forcing the movable valve member to the open position upon disengagement of the frame member from the stationary valve member to permit fluid to flow through said opening.

6. The apparatus of claim 1, wherein the frame member is formed to include a base and at least two fingers extending upwardly away from the base, and further comprising a flange ring coupled to the stationary valve member for engaging the fingers of the frame member to couple the frame member to the stationary valve member.

7. The apparatus of claim 6, wherein the bimetallic frame member includes a first metal material having a first coefficient of thermal expansion located radially outwardly from a second metal material having a second coefficient of thermal expansion, and wherein the first coefficient of thermal expansion is greater than the second coefficient of thermal expansion so that the at least two fingers of the frame member move radially inwardly to disengage the fingers of the frame member from the flange ring when the ambient temperature exceeds the second predetermined temperature.

8. The apparatus of claim 1, wherein the movable valve member is coupled to a first end of the operating spring and the frame member is coupled to a second end of the operating spring to prevent loose parts from entering the cooling system of the engine upon disengagement of the frame member from the stationary valve member.

9. The apparatus of claim 1, further comprising a bypass valve member coupled to the thermally responsive actuator for closing a bypass conduit of the cooling system in response to movement of the thermally responsive actuator.

10. The apparatus of claim 1, wherein the second predetermined temperature is set at about a maximum operating temperature of the engine.

11. A fail-safe thermostat apparatus for controlling fluid flow through an engine cooling system in response to changes of an ambient temperature surrounding the apparatus, the apparatus comprising:
- a stationary valve member configured to be positioned between conduit components of the engine cooling system, the stationary valve member being formed to include a flange ring and a valve seat configured to define an opening into a conduit;
- a movable valve member for engaging the valve seat to block fluid flow into the conduit through the opening;
- an operating spring for biasing the movable valve member to a closed position against the valve seat of the stationary valve member;
- a thermally responsive actuator coupled to the stationary valve member and to the movable valve member to move the movable valve member to an open position away from the valve seat when the ambient temperature exceeds a first predetermined temperature to permit fluid flow into the conduit;
- a bimetallic frame member having at least two fingers configured to engage the flange ring of the stationary valve member to couple the frame member to the stationary valve member and having a base to compress and hold the operating spring in engagement with the movable valve member, the fingers of the frame member being configured to move radially inwardly and disengage from the flange ring of the stationary valve member when the ambient temperature exceeds a second predetermined temperature greater than the first predetermined temperature; and
- a fail-safe spring located on an opposite side of the movable valve member from the operating spring, the fail-safe spring applying a biasing force against the movable valve member away from the valve seat to move the movable valve member to the open position upon disengagement of the frame member from the stationary valve member, the movable valve member being configured to block inward movement of the fingers when the movable valve member is in the open position, thereby preventing disengagement of the frame member from the stationary valve member.

12. The apparatus of claim 11, wherein the thermally responsive actuator includes a movable stem, and wherein the stationary valve member includes a flange trapped between the conduit components of the engine cooling system and a bridge for coupling the stem of the thermally responsive actuator to the stationary valve member.

13. The apparatus of claim 12, wherein the fail-safe spring is located between the movable valve member and the bridge for forcing the movable valve member to the open position upon disengagement of the frame member from the stationary valve member to permit fluid to flow through said opening.

14. The apparatus of claim 11, wherein the bimetallic frame member includes a first metal material having a first coefficient of thermal expansion located radially outwardly from a second metal material having a second coefficient of thermal expansion, and wherein the first coefficient of thermal expansion is greater than the second coefficient of thermal expansion so that the at least two fingers of the frame member move radially inwardly to disengage the fingers of the frame member from the flange ring when the ambient temperature exceeds the second predetermined temperature.

15. The apparatus of claim 11, wherein the movable valve member is coupled to a first end of the operating spring and the frame member is coupled to a second end of the operating spring to prevent loose parts from entering the cooling system of the engine upon disengagement of the frame member from the stationary valve member.

16. The apparatus of claim 11, further comprising a bypass valve member coupled to the thermally responsive actuator for closing a bypass conduit of the cooling system in response to movement of the thermally responsive actuator.

17. The apparatus of claim 11, wherein the second predetermined temperature is set at about a maximum operating temperature of the engine.

18. The apparatus of claim 11, wherein the operating spring applies a larger biasing force to the movable valve member than the fail-safe spring so that the movable valve member is normally closed.

19. A fail-safe thermostat apparatus for controlling fluid flow through an engine cooling system in response to changes of an ambient temperature surrounding the apparatus, the apparatus comprising:
- a valve configured to be positioned between conduit components of the engine cooling system, the valve being movable from a closed position to block fluid flow into a conduit to a radiator to an open position to permit fluid flow into the conduit;
- means for actuating the valve to move the valve to the open position when the ambient temperature exceeds a first predetermined temperature, the actuating means moving the valve to the closed position when the ambient temperature drops below the first predetermined temperature;
- means for permanently moving the valve to the open position when the ambient temperature exceeds a second predetermined temperature greater than the first predetermined temperature and upon failure of the actuating means to open the valve; and
- means for preventing operation of the moving means when the actuating means is functioning properly to open and close the valve.

20. A thermostat apparatus for controlling fluid flow through an engine cooling system in response to changes of an ambient temperature surrounding the apparatus, the apparatus comprising:
- a stationary valve member formed to include a valve seat configured to define an opening into a conduit;
- a movable valve member for engaging the valve seat to block fluid flow into the conduit through the opening;
- an operating spring for biasing the movable valve member to a closed position against the valve seat;
- a thermally responsive actuator for moving the movable valve member to an open position away from the valve seat when the ambient temperature exceeds a first predetermined temperature to permit fluid flow through the conduit; and
- a bimetallic frame member for compressing the operating spring in engagement with the movable valve member, the frame member being configured to release the compression on the operating spring when the ambient temperature exceeds a second predetermined temperature greater than the first predetermined temperature to permit the movable valve member to move away from the valve seat.

21. The apparatus of claim 20, wherein the movable valve member is configured to prevent disengagement of the frame member from the stationary valve member when the movable valve member is in the open position.

22. A thermostat apparatus for controlling fluid flow through an engine cooling system in response to changes of an ambient temperature surrounding the apparatus, the apparatus comprising:

a valve configured to be positioned between conduit components of the engine cooling system, the valve being movable from a closed position to block fluid flow into a conduit to a radiator to an open position to permit fluid flow into the conduit;

means for actuating the valve to move the valve to the open position when the ambient temperature exceeds a first predetermined temperature, the actuating means moving the valve to the closed position when the ambient temperature drops below the first predetermined temperature; and a bimetallic frame member for supporting the actuating means, the frame member releasing the actuating means to cause the valve to move to the open position when the ambient temperature exceeds a second predetermined temperature greater than the first predetermined temperature and upon failure of the actuating means to open the valve.

* * * * *